Patented Feb. 1, 1944

2,340,758

UNITED STATES PATENT OFFICE 2,340,758

EXTRACTION OF COFFEE

William Kappenberg, Queens Village, and Frank J. Rameh, New York, N. Y., assignors to Coffee Products Corporation, New York, N. Y., a corporation of New York No Drawing. Application May 22, 1942, Serial No. 444,044

9 Claims. (Cl. 99—71)

This invention relates to improvements in the production of concentrated coffee extracts or coffee concentrates.

This application is a continuation-in-part of my prior application Serial No. 280,059, filed June 20, 1939.

It has previously been proposed to produce liquid or dry extracts of coffee by various processes, including extraction with hot water followed by concentration, for example, under a vacuum; extraction with hot or cold water countercurrently, bringing the water into contact with sufficient masses of coffee so that the final product is concentrated and does not require concentration; soaking coffee in water and subsequently expressing under high pressures, etc. However, none of these previously proposed processes has yielded a commercially feasible product, either because of the fact that the products produced, when diluted with hot or boiling water, do not give beverages approximating freshly brewed coffee, or because of low yield, or prohibitive production cost, or lack of control of the quality of the product.

The present invention provides processes by which concentrated coffee extracts, which when diluted with hot or boiling water give brews comparable with freshly brewed coffee from the same type of bean, may be produced by subjecting ground roasted coffee to what may be termed "countercurrent" extraction with cool or cold water, that is, water at a temperature of about 100° F., or lower, advantageously below 85° F. under operating conditions such that substantially all of the desirable extractible matter is extracted from the coffee while the throughput is maintained sufficiently high so that the operating cost is low and the time of contact of the water with the coffee is not so great as to cause objectionable changes in flavor and aroma. The process is carried out by passing water through a mass or a series of masses of coffee, using sufficient initial pressure on the water to insure proper flow through the coffee. The initial portion of the coffee through which the fresh water passes naturally becomes exhausted first, while the successive portions or masses are extracted to successively lesser degrees because of the increase in concentration of extractibles in the treating water. Accordingly, when the intial portion of the coffee or first mass in the series is sufficiently leached, it is removed from the system and a corresponding fresh mass or quantity is introduced at the other end of the extraction system, so that the portion of coffee with which fresh water comes into contact has previously been subjected to successive extractions with coffee extracts of decreasing concentration, while the final concentrate is that which passes through the fresh coffee.

In carrying out this process, it was found that irregularity in operation, for example, with respect to the rate at which the water, under any given pressure, would flow through the coffee, the proportion of water soluble material extracted, etc., varied widely, and that the extraction could not be carried out with any reasonable assurance of proper operation or sufficiently complete extraction to make the process commercially feasible.

The present invention includes improvements in this type of process which permit high yield, i. e., substantially complete extraction of the extractible constituents of the coffee; continuous operation without channelling, clogging, building up of high back-pressures and the like; high throughput or output from given apparatus at low cost; and the production of a product of consistently high concentration and quality.

In accordance with the present invention, the fresh masses of coffee are wetted or dampened with water, or aqueous liquids including skimmed mink, aqueous alcohol, aqueous glycerol, sugar solutions and/or the like, before passing through them the extract from the preceding masses of coffee.

The amount of water used to wet the roasted ground coffee before passing the extracting liquid through it may be varied, but the amount used should be sufficient to cause rather complete expansion of the coffee while not so great as to form a mud or slurry, or to dilute the final coffee concentrate too much.

Advantageously from about eight to about sixteen ounces, preferably about twelve ounces of water per pound of solids, usually only coffee, is used. Dissolved or suspended matter in the prewetting liquid is to be considered as solids. The prewetting liquid should be uniformly distributed throughout the mass of coffee, as by spraying it with agitation of the coffee, etc. Eighteen to twenty ounces of water usually forms a mud or slurry and consequently is not desirable. The amount of water advantageously used depends to some extent on the grind of the coffee. Very finely ground coffee in general requires somewhat more water for dampening or prewetting to give the optimum results than does more coarsely ground coffee; but in general, the range given above may be used for any grind which is feasibly extracted. The concentration of the extract obtained will depend to some extent on the amount of liquid used for prewetting. To obtain highly concentrated extracts, relatively small amounts of liquid should be used for prewetting, e. g., eight or ten ounces per pound of coffee. If less concentrated extracts are unobjectionable, larger quantities of water, e. g., fourteen to sixteen ounces per pound, may be used with advantage. However, for general operation, the prewetting with three-quarter pounds of water to one pound of solids gives optimum results.

The wetted coffee after expansion is transmitted to the extraction chamber where it is packed either by hand or mechanically to a density that must be within certain rather narrow limits to permit proper operability. It has been found that the density must be within the range of thirty-four to forty-five pounds of wetted coffee per cubic foot and for most efficient results advantageously should be forty and forty-two pounds per cubic foot. If these limits are not met very great operational difficulties are encountered and more specifically the extraction chambers such as pipes, tubes, columns, towers or conveyors will jam and so prevent passage of extraction liquids. In other cases, channeling or by-passing with resultant low extraction yields, and concentrates of low and uneconomical gravity are obtained. Finally it is not feasible to dampen or pre-wet the fresh coffee in the extraction chamber because it cannot be evenly wetted and, more serious, it expands when wetted within the restricted space thus causing the formation of dense masses and consequent jamming. By such prewetting and controlled packing of the coffee, more consistent results are obtained, more finely ground coffee can be used, the throughput can be greatly increased, that is, the time required to extract a given quantity of coffee in a given apparatus may be greatly decreased, and the proportion of extractible material extracted may be radically increased. Perhaps the most important advantage is the fact that with such prewetting of the coffee, a high proportion of the desirable extractible material is consistently extracted and carried into the concentrate. The greatest expense in the production of coffee extracts is in the cost of the roasted coffee required, and a more thorough extraction naturally reflects a greater yield of concentrate of given flavoring value from a given quantity of coffee.

An advantageous method of extracting the coffee in accordance with the invention is with the use of a series of vertical tubes, with connections from the top of one tube to the bottom of the next. With such apparatus, fresh water may enter at the bottom of the first tube, flow upwardly through the coffee in the tube, and from the top of this tube pass to the bottom of the second tube and progress in this manner through each of the tubes until the desired concentrate is discharged from the top of the last tube. When the coffee in the first tube is sufficiently extracted, it is removed from the apparatus and a tube containing fresh coffee is attached at the opposite end of the series. The fresh coffee, before introduction into this tube, and before the extract from the previous tubes is caused to flow through it, is wet or dampened, as described hereinbefore, with an appropriate quantity of water and packed to the proper density to insure regularity of flow and proper extractions.

It is important to provide at the outlet of each tube a bed of rather coarse filtering material, inert with respect to the coffee extract, e. g., 20 to 30 mesh granules, coarse fibrous material or the like, such as sand, metal shavings or other suitable material. The bed need not be very deep, i. e., one to two inches is generally sufficient, but its provision is important, because without it, the screen or cloth used to hold the coffee in the tube becomes clogged, with the result that the extracting liquid passes through the screen or cloth with difficulty, and in a short time may cease to flow.

Other types of apparatus than that referred to may, of course, be used in carrying out the process. For example, instead of providing a series of vertical tubes in series, a single vertical tube may be provided, and the process may be carried out by introducing water at the bottom and taking coffee extract from the top, with removal, at intervals determined by the extent of extraction, of portions of the extracted coffee from the bottom and introduction of fresh, dampened or prewetted coffee at the top, a suitable filtering layer being provided at the top of each successively introduced mass of coffee.

The invention will be further illustrated by the following specific description, but it is not limited thereto.

Roasted bean coffee, Santos #3, rather finely ground, having a screen analysis of 27.1% retained on a 20 mesh screen, 44.7% retained on a 40 mesh screen and 28.2% passing a 40 mesh screen is thoroughly mixed with twelve ounces of water per pound of coffee and introduced into three vertical tubes each six feet long and four inches in inner diameter. The coffee is introduced in successive portions with intermediate tamping to a density of about forty-two pounds per cubic foot. A layer of sand two inches thick is placed on top of the tamped coffee in each tube. Screens are provided at the top and bottom of each tube to retain the sand layer and coffee in place. The top of the first tube is connected to the bottom of the second, and the top of the second to the bottom of the third. Water at a temperature of about 70 to 80° F. is introduced at the bottom of the first tube under an initial pressure of about twenty-five pounds; the coffee extract flowing from the top of the third tube. After about 0.82 gallons of extract is obtained, the first tube is removed, the water inlet connected to the bottom of the second tube and the top of the third tube connected to the bottom of a fourth tube containing fresh, pre-wet and tamped coffee, with a bed of sand on top of the coffee, the process being continued in this fashion with successive replacements of the completely extracted coffee with fresh coffee, one tube being replaced for each 0.82 gallons of extract produced. After at least three tubes have been replaced and removed in this fashion, the process is considered to be a countercurrent process, and the extract thus obtained contains around 27% solids, which is almost all of the material which can be extracted from the coffee. In the course of the operation, the initial pressure is maintained uniformly between twenty-five and ninety pounds per square inch gage, preferably about 40 p. s. i., pressures of this order giving substantially constant results. Five cc. of the extract, when diluted with hot or boiling water, gives a cup of brew fully comparable to freshly prepared coffee brew made from the same type of bean by conventional means. The coffee concentrate so obtained requires no further concentration before being taken to dryness with or without additional agents such as sugars and the like.

In the operation described, three tubes, six feet long and four inches in diameter, are used, so that the extracting liquid is passed through a column of ground coffee about eighteen feet long. Almost the same results may be obtained with the use of two such tubes, or five or six such tubes; although as the number of tubes is varied, it may be necessary to adjust somewhat the rate of flow of the extracting liquid, for example, by adjusting the pressure at which the water is supplied. As the length of the column of coffee is increased, as by the use of more tubes, the pressure at which the water is supplied must be increased to maintain the throughput.

Although the above example describes the use of four-inch tubes, it has been found in commercial operation that tubes twelve inches in diameter are equally satisfactory and more desirable from an output standpoint. The length of the column of coffee, the number of tubes used, the diameter of the tubes and the number thereof may be varied with good results, providing there is a sufficiently long column of coffee to permit adequate extraction and providing the initial pressure is sufficient, taken together with the prewetting, tamping and provision of suitable filtering beds, to provide the desired throughout.

In general, the amount of extracting liquid passed through the coffee governs the concentration of the soluble coffee in the final liquid coffee concentrate. The rate of flow of the extracting liquid should be such that a volume of water equal to the volume of coffee held in the apparatus will flow through the coffee in from one to four hours, preferably in about one and a half hours. Higher rates tend to build up high back-pressures and lower rates are uneconomical. An advantageous rate of flow yields 0.082 gallons of concentrated liquid coffee extract per pound of roasted coffee. This same liquid coffee concentrate contains 2.6 pounds soluble coffee per gallon of concentrate.

The coffee concentrate obtained by the process of this invention is in a state of high concentration, hence great thermal economies are obtained when taking the concentrated liquid coffee extract to dryness because no preconcentration is required in most cases. Furthermore, the flavor and aroma characteristics of the finished dry product are improved because of the very greatly lowered time required to remove water in the drying operation proper.

The initial water pressure used may be varied over a wide range, depending mainly upon the rate of flow desired, the length of the column of coffee, and the fineness of the grind. Pressures in excess of fifteen pounds, e. g., up to 300 pounds or even more, are usually required for any reasonably economic rate of flow. Pressures of from twenty-five to one hundred fifty pounds are advantageously used.

The rate of flow, the effectiveness of extraction per unit volume of aqueous solvent and hence the economic value of the process of this invention, will also depend upon the grind of the coffee. With finely ground coffee, the rate of flow at any given pressure will generally be smaller than with more coarsely ground coffee; on the other hand, the extraction is more complete and uniform with the more finely ground coffee. Ground coffee having a screen analysis of about 26% retained on a 20 mesh screen and 45% retained on a 40 mesh screen, with the remainder passing a 40 mesh screen, gives excellent results. More finely ground coffee may be used, but tends to cut down the rate of flow. More coarsely ground coffee, for example, coffee with a screen analysis of about 65% retained on a 20 mesh screen and 25% on a 40 mesh screen with the remainder passing a 40 mesh screen, also gives excellent results. Coffee with a screen analysis of about 2% retained on a 12 mesh screen, about 75% on a 20 mesh screen and about 15% on a 40 mesh screen, with the remainder through a 40 mesh screen, is about as coarse as can be used with consistently high extraction, although again if the length of the column of coffee is increased, good results may be obtained with even coarser grinds.

One of the important advantages of the process is that the time required for the extraction of any given amount of coffee is short, so that the development of off-flavors, rancidity, or change by bacterial attack, molds, yeast or the like is avoided.

Instead of using water for the extraction of the roasted coffee, other aqueous liquids, for example, skimmed milk, sugar solutions, aqueous coffee extracts, preferably concentrated, e. g., specific gravity of about 1.05 at 110° F., or extracts of various materials, such as chicory, may be used, with production of modified concentrates. The extract obtained from the process varies slightly during the extraction depending on the prewetting liquid and the degree and rate of extraction. The specific gravity is preferably between 1.1 to 1.2 at 110° F. Low concentration, e. g., specific gravity of 1.02 up to 1.07 at 110° F., are used as prewet liquids.

The extracting liquid may advantageously contain a small proportion of a suitable non-toxic, unobjectionably flavored wetting or emulsifying agent, which seems to promote the extraction; and a small amount of a non-toxic, unobjectionably flavored anti-oxidant, a number of which are available, may advantageously be incorporated in the concentrate, either by addition to the concentrate or to the extracting liquid, to inhibit the development of objectionable flavors due to oxidation or change on storage. Although coffee has been described hereinbefore as the material to be extracted, it is possible to treat similarly other water extractible granular food substances which form potable decoctions, such as ground roasted barley, wheat and the like.

The product directly produced by the process of this invention is a liquid coffee concentrate. When diluted with hot or boiling water, it yields a beverage comparable to conventionally, freshly brewed coffee. The liquid product can, by a suitable spray drying process, as by spraying into a stream of hot air or other gas, e. g., concurrently or countercurrently, be converted to a dry product which is soluble in water, and retains substantially all of the desirable properties of the liquid concentrate, and hence, when dissolved in hot or boiling water, yields a beverage fully equivalent to freshly brewed coffee. Or the liquid can be converted to an excellent dry product by vacuum drying processes, e. g., vacuum drum drying.

As many widely varying embodiments of the present invention may be made without departing from the spirit and scope thereof; it is to be understood that this invention is not to be limited except as defined in the appended claims.

We claim,

1. The process of preparing a concentrated coffee extract which comprises substantially uniformly prewetting ground roasted coffee with an aqueous liquid in the ratio of one-half to one pound of water per pound of coffee, providing a bed of said prewetted coffee at a substantially uniform density of about 34 to 45 pounds per cubic foot, and extracting it with an extract obtained by passing an aqueous liquid through partially extracted ground roasted coffee.

2. The process of producing a concentrated coffee extract which comprises producing a substantially uniformly prewetted ground roasted coffee by treating with water in an amount ranging from about 8 to 16 ounces of water per pound of coffee, introducing said wetted coffee into an extraction zone, tamping it to a substantially uniform density of about 34 to 45 pounds per cubic foot, and passing an aqueous liquid through said coffee to obtain a coffee extract.

3. A countercurrent process of producing a concentrated coffee extract which comprises treating ground roasted coffee with an aqueous liquid in an amount varying from one-half to one pound of water per pound of solids, introducing said wetted coffee into an elongated extraction zone at a substantially uniform density of about 34 to 45 pounds per cubic foot, providing a layer of inert filtering material at the discharge from the extraction zone, passing through said prewetted coffee in the extraction zone an aqueous extract of a ground roasted coffee, which coffee has been previously partially extracted in the previous cycle, to obtain a concentrated aqueous coffee extract, after a substantial extraction period similarly adding another extraction zone of fresh prewetted, tamped coffee to the extraction system, and removing a corresponding exhausted zone.

4. The process of preparing a concentrated coffee extract which comprises treating ground roasted coffee with skimmed milk in an amount varying from one-half to one pound of water to a pound of solids, providing an extraction bed of said wetted coffee at a density between 34 and 45 pounds per cubic foot, and extracting it with an aqueous liquid.

5. The process of producing a concentrated coffee extract which comprises producing a substantially uniformly prewetted ground roasted coffee by treating with water in an amount of about 12 ounces of water per pound of coffee, introducing said wetted coffee into an extraction zone, tamping it to a substantially uniform density of about 34 to 45 pounds per cubic foot, and passing an aqueous liquid through said coffee to obtain a coffee extract.

6. The process of producing a concentrated coffee extract which comprises producing a substantially uniformly prewetted ground roasted coffee by treating with water in an amount ranging from about 8 to 16 ounces of water per pound of coffee, introducing said wetted coffee into an extraction zone, tamping it to a substantially uniform density of about 40 to 42 pounds per cubic foot, and passing an aqueous liquid through said coffee to obtain a coffee extract.

7. The process of producing a concentrated coffee extract which comprises producing a substantially uniformly prewetted ground roasted coffee by treating with water in an amount of about 12 ounces of water per pound of coffee, introducing said wetted coffee into an extraction zone, tamping it to a substantially uniform density of about 40 to 42 pounds per cubic foot, and passing an aqueous liquid through said coffee to obtain a coffee extract.

8. The process of preparing a concentrated coffee extract which comprises treating ground roasted coffee with a concentrated aqueous coffee extract in an amount varying from one-half to one pound of water to a pound of solids, providing an extraction bed of said wetted coffee at a density between 34 and 45 pounds per cubic foot, and extracting it with an aqueous liquid.

9. The process of preparing a concentrated coffee extract which comprises prewetting ground roasted coffee with an aqueous liquid, forming a bed of said prewetted coffee and compacting it to a substantially uniform extent so that its density is above 34 pounds per cubic foot but less than that value at which the coffee bed remains substantially impervious to an extracting liquid, and passing an aqueous liquid through the coffee bed to remove the coffee extracts.

WILLIAM KAPPENBERG.
FRANK J. RAMEH.